United States Patent
Theodoras, II et al.

(10) Patent No.: US 6,684,350 B1
(45) Date of Patent: Jan. 27, 2004

(54) REPETITIVE PATTERN TESTING CIRCUIT FOR AC-COUPLED SYSTEMS

(75) Inventors: James T. Theodoras, II, Plano, TX (US); Andrew J. Thurston, Allen, TX (US); Daniel L. Chaplin, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 564 days.

(21) Appl. No.: 09/746,895

(22) Filed: Dec. 22, 2000

(51) Int. Cl.$^7$ .............................................. G01R 31/28
(52) U.S. Cl. ....................... 714/712; 714/713
(58) Field of Search ................................ 714/712, 713, 714/799, 757, 820, 738

(56) References Cited

U.S. PATENT DOCUMENTS 5,519,719 A * 5/1996 Elpers et al.
5,600,660 A * 2/1997 Wolf

* cited by examiner

Primary Examiner—Phung M. Chung
(74) Attorney, Agent, or Firm—Campbell Stephenson Acolese LLP (57) ABSTRACT

A method for testing a signal path for mark ratio tolerance includes generating a varying test pattern by selecting between a first pattern and a second pattern according to a defined sequence; and sending the varying test pattern over the signal path. An apparatus disposed in a communication system includes a selection circuit for generating a varying test pattern to send over the signal path, the selection circuit generating the varying test pattern by selecting between a first pattern and a second pattern according to a select sequence signal, and a sequencer coupled to the selection circuit, the sequencer providing the select sequence signal to the selection circuit, the sequencer generating the select sequence signal according to a mode value. The mark ratio tolerance of a system can be tested, varying the data density of one portion of the signal path while maintaining a constant data density on another portion of the signal path.

30 Claims, 8 Drawing Sheets

REPETITIVE PATTERN TESTING CIRCUIT FOR AC-COUPLED SYSTEMS

BACKGROUND OF THE INVENTION

1. Field of the Invention

The present invention relates generally to data communications, and more particularly to performance testing of high speed data links.

2. Description of the Related Art

A data communications network is the interconnection of two or more communicating entities (i.e., data sources and/or sinks) over one or more data links. A data communications network allows communication between multiple communicating entities over one or more data communications links. High bandwidth applications supported by these networks include streaming video, streaming audio, and large aggregations of voice traffic. In the future, the demands for high bandwidth communications are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among several protocols designed to employ an optical infrastructure. SONET is widely employed in voice and data communications networks. SONET is a physical transmission vehicle capable of transmission speeds in the multi-gigabit range, and is defined by a set of electrical as well as optical standards. A similar standard to SONET is the Synchronous Digital Hierarchy (SDH) which is the optical fiber standard predominantly used in Europe. There are only minor differences between the two standards. Accordingly, hereinafter any reference to the term SONET refers to both SDH and SONET networks, unless otherwise noted.

SONET utilizes a byte-interleaved multiplexing scheme. Multiplexing enables one physical medium to carry multiple signals. Byte interleaving simplifies multiplexing and offers end-to-end network management. Each STS is transmitted on a link at regular time intervals (for example, 125 microseconds) and grouped into frames. See Bellcore Generic Requirements document GR-253-CORE (Issue 2, December 1995), hereinafter referred to as "SONET Specification," and incorporated herein by reference for all purposes. The first step in the SONET multiplexing process involves the generation of the lowest level or base signal. In SONET, this base signal is referred to as synchronous transport signal—level 1, or simply STS-1, which operates at 51.84 Mbps (Megabits per second). Data between adjacent nodes is transmitted in these STS modules. Higher-level signals are integer multiples of STS-1, creating the family of STS-N signals in Table 1. An STS-N signal is composed of N byte-interleaved STS-1 signals. Table 1 also includes the optical counterpart for each STS-N signal, designated optical carrier level N (OC-N).

TABLE 1

| SIGNAL | BIT RATE (Mbps) |
|---|---|
| STS-1, OC-1 | 51.840 |
| STS-3, OC-3 | 155.520 |
| STS-12, OC-12 | 622.080 |
| STS-48, OC-48 | 2,488.320 |
| STS-192, OC-192 | 9,953.280 |

NOTE:
Mbps = Megabits per second
STS = synchronous transport signal
OC = optical carrier SONET organizes STS datastreams into frames, consisting of transport overhead and a synchronous payload envelope. The overhead consists of information that allows the network to operate and allow communications between a network controller and nodes. The transport overhead includes framing information and pointers, and performance monitoring, communications, and maintenance information. The synchronous payload envelope is the data to be transported throughout the network, from node to node until the data reaches its destination.

In a data communication network transporting OC-192 signals at 9.953280 Gbps (Giga bits per second), it is impractical to clock all devices at that high rate. In digital transmission, a clock refers to a series of repetitive pulses that keep the bit rate of data constant and indicate the location of ones and zeroes in a data stream. Instead of clocking all devices at the high data stream rate, data is often transferred between devices at lower data rates, then increased to the higher data rate. For example, a serial bit stream operating at a high data rate can be de-serialized into 16 parallel bits and clocked at $\frac{1}{16}^{th}$ the high data rate and later serialized again running at the higher data rate without changing the amount of data throughput. A framing logic device manipulates the data stream at clock rates ranging from 38.88 MHz to 622.08 MHz. The framing logic device (also referred to as a "framer") transmits a 16-bit parallel data stream to a serializer at 622.08 MHz. The serializer sends the parallel data stream as a bit wide data stream at 9.953280 GHz.

Figures 1A, 1B:
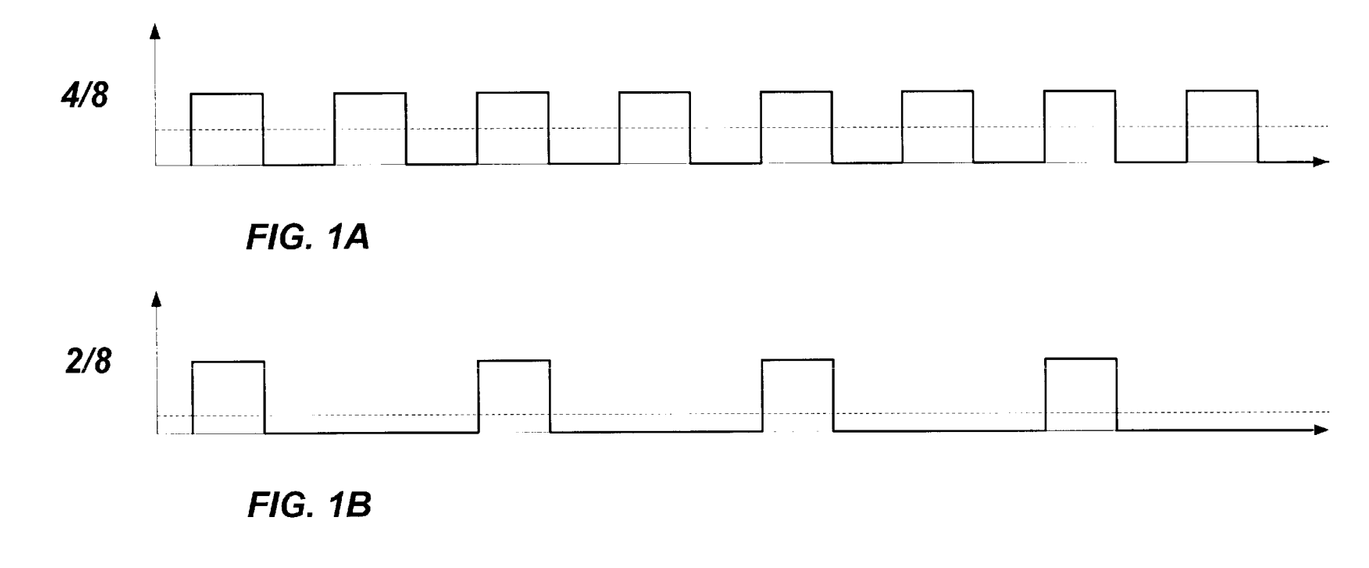
FIGS. 1A–1C illustrate a bit stream having varying mark ratios and data densities.
Figure 1C:
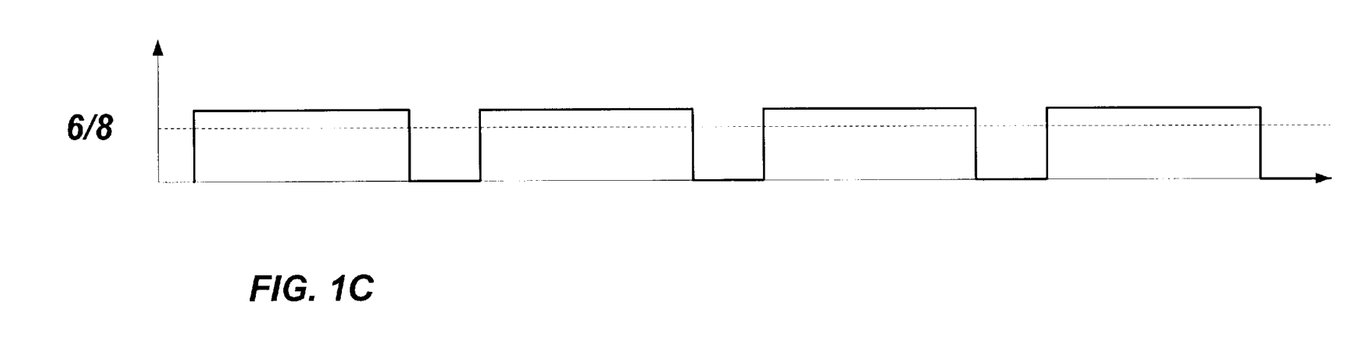

The system components must be highly reliable and have good mark ratio tolerance transferring data at these high rates. Mark ratio tolerance is the amount of data density variance a signal path can tolerate before taking bit errors. A signal path requires a minimum signal toggle rate between 1's and 0's to keep the system functioning and DC balanced. Data density is the DC average of the signal. FIGS. 1A–1C illustrate a bit stream having varying mark ratios and data densities. FIG. 1A illustrates a bit stream with a mark ratio of 4/8 represented by four 1's for every four 0's. FIG. 1A has a 50% data density represented by the dotted line. FIG. 1B illustrates a bit stream with a mark ratio of 2/8 represented by two 1's for every six 0's. FIG. 1B has a 25% data density represented by the dotted line. FIG. 1C illustrates a bit stream with a mark ratio of 6/8 represented by six 1's for every two 0's. FIG. 1C has a 75% data density represented by the dotted line. A data communication network node goes though rigorous mark ratio tolerance testing prior to product release. A circuit that can transmit data with a mark ratio of 1/8 is considered to be a robust design.

The high speed signal path including signal lines, cables, and components such as optical transmitters and optical receivers are tested for mark ratio tolerance during design verification, circuit board test and system test before product release. Normally, a designer is dependent on random data from an LFSR (linear feedback shift register) to check for data dependencies in an optical transmitter or receiver. A pseudo-random bit stream (PRBS) is used to test components in a signal path for sensitivity to high ones or zeros density. A PRBS allows every combination of 1's and 0's to be tested. System performance information can be derived by analyzing the signal path's eye pattern from the PRBS on an oscilloscope display. An open eye pattern corresponds to minimal signal distortion. A closed eye pattern corresponds to distortion of the signal waveform due to various errors such as pattern dependency and noise. To improve a circuit's mark ratio tolerance, different circuit improvements can be implemented such as changing the line termination, changing the sensitivity of various components, and increasing or decreasing capacitor size. Various components of a data communications node must meet certain minimum mark ratio tolerance standards prior to product release and must go through rigorous qualification testing.

Determining the mark ratio tolerance of an entire system using a PRBS is difficult since a signal path typically consists of multiple components, cabling, and often performs serializing and de-serializing of the data. A PRBS that creates a data density of 50% on a serial line may create a data density of 100% or 0% on parallel signal lines creating differing mark ratios for different portions of the same signal path. For example, considering a parallel four-bit signal path that is later serialized into a one bit signal path, a PRBS of "1010" creates a data density of 50% on the one bit signal path, a data density of 100% on the first and third bits of the parallel signal path, and a data density of 0% on the second and fourth bits of the parallel signal path. The signal path often has capacitors connected serially on the signal path to AC couple devices, such as integrated circuits, of different technologies to level shift between different voltage ranges. Parallel AC coupled signal paths do not perform well under certain test conditions and give erroneous mark ratio tolerance failures. AC coupling of a parallel path often precludes the use of repetitive test patterns. DC drift on the capacitors during the mark ratio testing results in bit errors often causing the signal path to effectively shut down and stop functioning. Previous solutions required the signal path to be tested in pieces, giving only partial results or unreliable overall system mark ratio tolerance results. Other solutions include using extremely large capacitors such that the effects of DC drift takes longer to accumulate. This solution is undesirable due to the need to perform measurements in a short amount of time before the capacitors fully charge. In addition, these large capacitors use a large amount of board space and can be costly.

A method and apparatus of testing a signal path for mark ratio tolerance is needed that can be automatic, provide for varying data densities, and test all parallel signal lines and serial signal lines including AC coupled lines. The test circuitry must allow for testing at high data rates while still allowing for traditional test equipment to be utilized.

SUMMARY OF THE INVENTION

Accordingly, a method and apparatus for testing a signal path for mark ratio tolerance is provided that is automatic, provides for varying data densities, and tests all parallel signal lines and serial signal lines including AC coupled lines. The test circuitry allows for testing at high data rates while still allowing for traditional test equipment to be utilized. The method includes generating a varying test pattern by selecting between a first pattern and a second pattern according to a defined sequence; and sending the varying test pattern over the signal path. The mark ratio tolerance of a system can be tested, varying the data density of one portion of the signal path while maintaining a constant data density on another portion of the signal path.

According to an embodiment, generating the varying test pattern includes writing a value to a pattern register, writing a value to mode register, and enabling test circuitry to vary the value written to the pattern register according to the value written to the mode register.

Another embodiment of the invention is directed to an apparatus which includes a selection circuit for generating a varying test pattern to send over the signal path, the selection circuit generating the varying test pattern by selecting between a first pattern and a second pattern according to a select sequence signal, and a sequencer coupled to the selection circuit, the sequencer providing the select sequence signal to the selection circuit, the sequencer generating the select sequence signal according to a mode value.

In one embodiment, the second pattern is an inversion of the first pattern. In another embodiment, the data density is varied to determine the mark ratio tolerance limits of the signal path.

In one embodiment the apparatus is implemented as an application specific integrated circuit (ASIC) and disposed on a line card in a synchronous optical network (SONET).

Another embodiment of the invention is directed to a computer program product for communication. The computer program product includes signal bearing media bearing programming adapted to generate a varying test pattern by selecting between a first pattern and a second pattern according to a defined sequence; and sending the varying test pattern over the signal path.

Another embodiment is directed to a communication system including means for generating a varying test pattern by selecting between a first pattern and a second pattern according to a defined sequence, and means for sending the varying test pattern over a signal path. The signal path has a first portion and a second portion, wherein the first portion is a one bit serial path and the second portion is a N bit parallel path. The mark ratio tolerance of a system can be tested, varying the data density of one portion of the signal path while maintaining a constant data density on another portion of the signal path.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following is intended to provide a detailed description of an example of the invention and should not be taken to be limiting of the invention itself. Rather, any number of variations may fall within the scope of the invention that is defined in the claims following the description.

Figure 2:
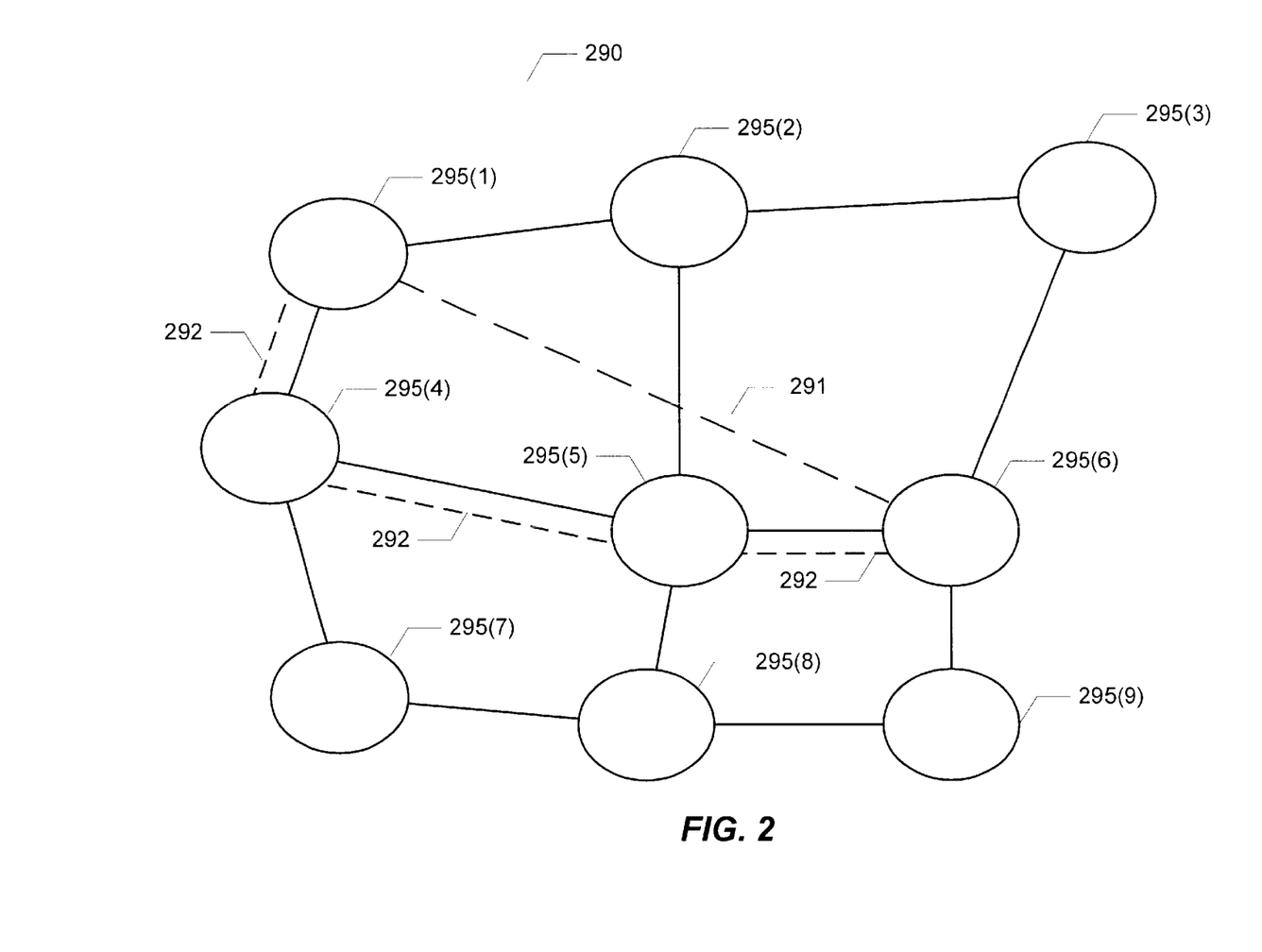
FIG. 2 illustrates a network environment in which embodiments of the present invention may be practiced.

FIG. 2 illustrates a network environment in which embodiments of the present invention may be practiced. Network 290 includes a number of nodes, network nodes 295(1)–(N). One or more of network nodes 295(1)–(N) can be a router such as router 300, described in FIG. 3, or any other type of telecommunication hub such as a repeater. Network 290, for example, can support the automatic provisioning, testing, restoration, and termination of virtual paths (exemplified by a virtual path 291) over a physical path (exemplified by a physical path 292) from one of network nodes 295(1)–(N) to another of network nodes 295(1)–(N). Physical path 292 may utilize fiber-optic cables, for example. While copper cabling may also be employed, such an option may not offer the speed and number of connections provided by an optical arrangement.

Figure 3:
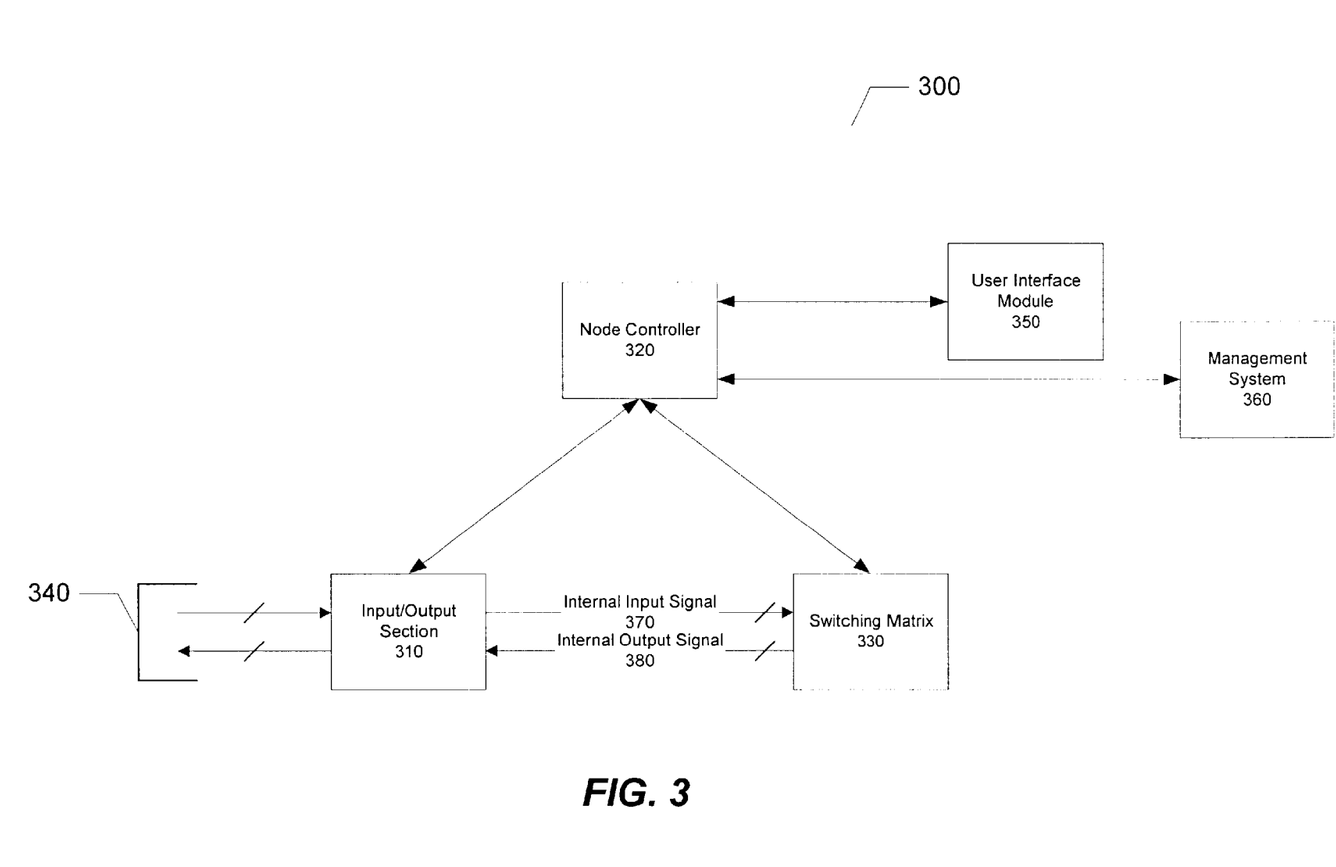
FIG. 3 illustrates a block diagram of an exemplary router.

FIG. 3 illustrates a block diagram of an exemplary router 300. Router 300 is a high-capacity telecommunication network device based on optical technologies and components that provides routing, grooming and restoration at the wavelength levels as well as wavelength-based services. Router 300 interconnects routers and switches across an optical transport network, accepting various wavelengths on input ports and routing them to appropriate output ports in the network. Router 300 provides routing for traffic at wavelength granularities (e.g., OC-48 or OC-192) and enables functionality to be controlled by software managed centrally.

Router 300 includes an input/output section 310, a node controller 320, and a switching matrix 330. Node controller 320 contains, for example, real time software and intelligent routing protocols (not shown). Router 300 supports interfaces including, but not limited to, optical signal interfaces 340 (e.g., SONET), a user interface module 350, and a management system 360. Internal input signals 370 and internal output signals 380 may be electrical or optical in nature. Router 300 preferably provides redundancy at all levels to prevent any single point system failure; processors, memory and communications are preferably 1:1 redundant.

Shelf or node controller 320 is responsible for managing and controlling input/output section 310, which can contain multiple line cards. Some of the functions handled by node controller 320 include the periodic collection of maintenance data from the line cards, receiving and processing periodic keep-alive messages from those cards, shelf startup and configuration, proxy management, and other related functions. Each line card is coupled to two fiber optic cables, one for each direction. The fiber optic cables support a standard OC-48 or OC-192 SONET data stream. Switching matrix 330 provides routing and switching between line cards.

In one embodiment, router 300 can be used, for example, as SONET line terminating equipment (LTE) capable of terminating the Section and Line overheads of received OC-48 and OC-192 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Figure 4:
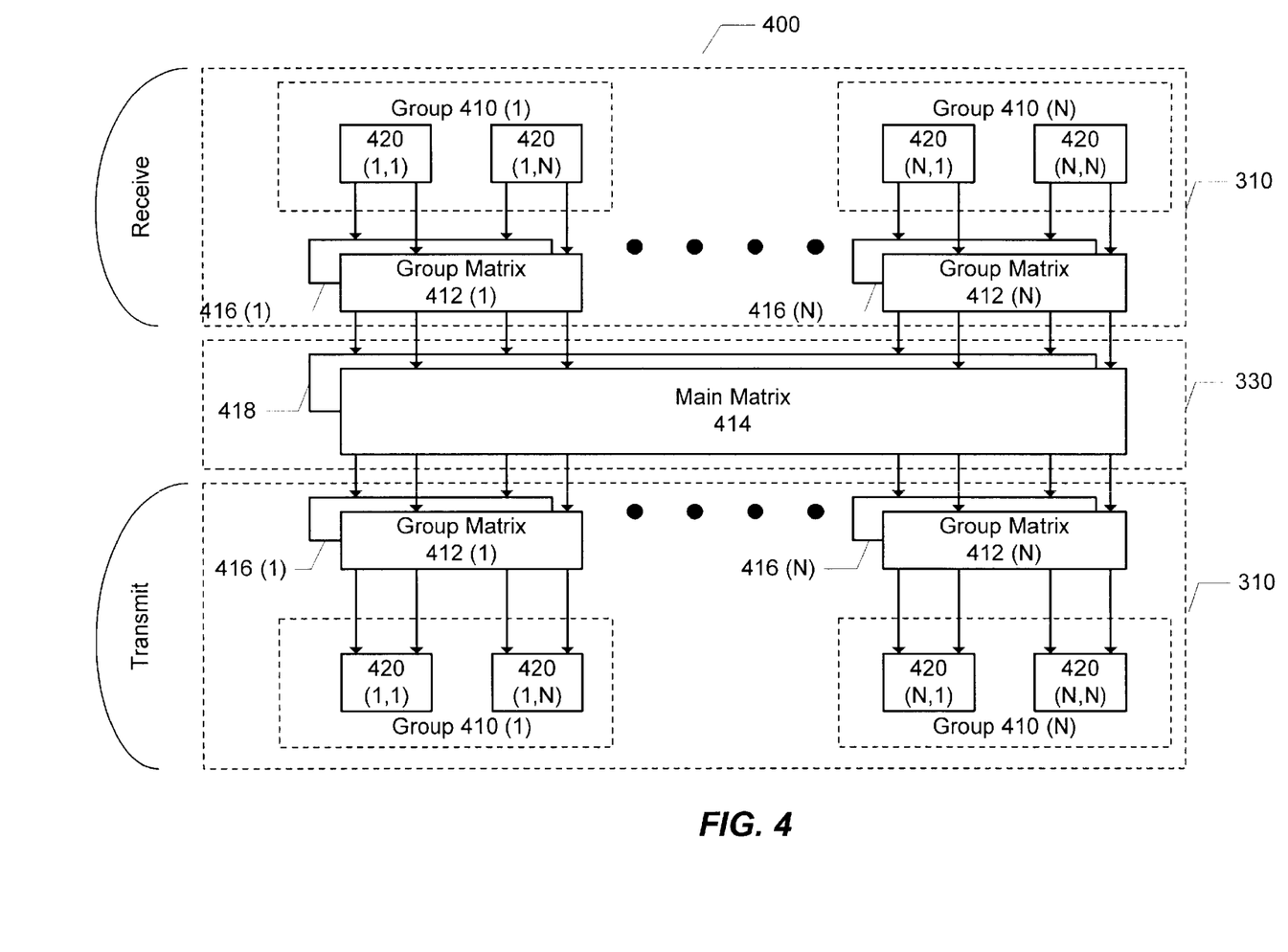
FIG. 4 illustrates a block diagram of the signal paths and functional blocks of an exemplary router.

FIG. 4 is a block diagram of signal paths 400 within router 300. The primary signal paths in router 300 include one or more groups exemplified by groups 410(1)–(N), group matrices 412(1)–(N), and a main matrix 414. Groups 410(1)–(N) and group matrices 412(1)–(N) are shown as having receive and transmit sections. Groups 410(1)–(N) each include line cards 420(1,1)–(1,N), through line cards 420(N,1)–(N,N). Signals from line cards 420(1,1)–(N,N) are sent to the corresponding group matrix. In one embodiment, two sets of the group matrix cards, depicted in FIG. 4 as group matrices 412(1)–(N) and 416(1)–(N), are employed. In one embodiment, main matrix 414 is also mirrored by a redundant copy (a backup main matrix 418). Main matrix 414 and backup main matrix 418 together form switching matrix 330. As shown in FIG. 4, redundancy for group matrices 412(1)–(N) (i.e., group matrices 416(1)–(N)) exists on the transmit side.

It will be noted that the variable identifier "N" is used in several instances in FIG. 4 and other figures (and subsequent use of other variables, such as "m," "x," "k," and others) to more simply designate the final element (e.g., group matrix 412(N), line card 420(N,N), and so on) of a series of related or similar elements (e.g., group matrices 412(1)–(N), line cards 420(1,1)–(N,N), and so on). The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" (or "m," "x," "k," and others) may hold the same or a different value than other instances of the same variable identifier. For example, group matrix 412(N) may be the tenth group matrix in a series of group matrices, whereas line card 420(N,N) may be the forty-eighth line card in a series of line cards.

Using signal paths 400 as an example, data enters the system at one of line cards 420(1,1)–(N,N). It is at this point, in a SONET-based system, that the Section and Line overheads are processed and stripped off by a protocol processor (not shown). The extracted SONET payload envelope is then synchronized with the system clock and sent to two different copies of a local matrix, depicted as group matrices 412(1)–(N) and 416(1)–(N). In one embodiment, group matrices 412(1)–(N) and 416(1)–(N) are used mainly as 2:1 reduction stages that select one of two optical signals and pass the selected optical signal to switching matrix 330. This allows the implementation of a variety of protection schemes (including 1:N, or 0:1) without having to use any additional ports on main matrix 414. All protect signals are terminated at group matrices 412(1)–(N) and 416(1)–(N). In order to maximize bandwidth, it is preferable that only active signals be passed through to switching matrix 330.

In one embodiment, switching matrix 330 is an errorless, rearrangeably nonblocking switching network. In one embodiment, switching matrix 330 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

Line cards 420(1,1)–(N,N) receive optical signals from group matrices 412(1)–(N) and 416(1)–(N) which are in turn connected to two separate copies of the main matrix. Line cards 420(1,1)–(N,N) monitor both signals for errors and, after a user-defined integration period, switch to the backup signal if that signal exhibits better signal quality (e.g., lower bit error rate (BER)) than the prior active signal. This scheme, referred to herein as 1-plus-1, allows line cards 420(1,1)–(N,N) to select between the two copies of the group matrix without any level-1 or level-2 CPU intervention. This helps to ensure that such a switch can be made in 50 ms or less (per Bellcore's recommendations in the SONET Specification). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Figure 5:
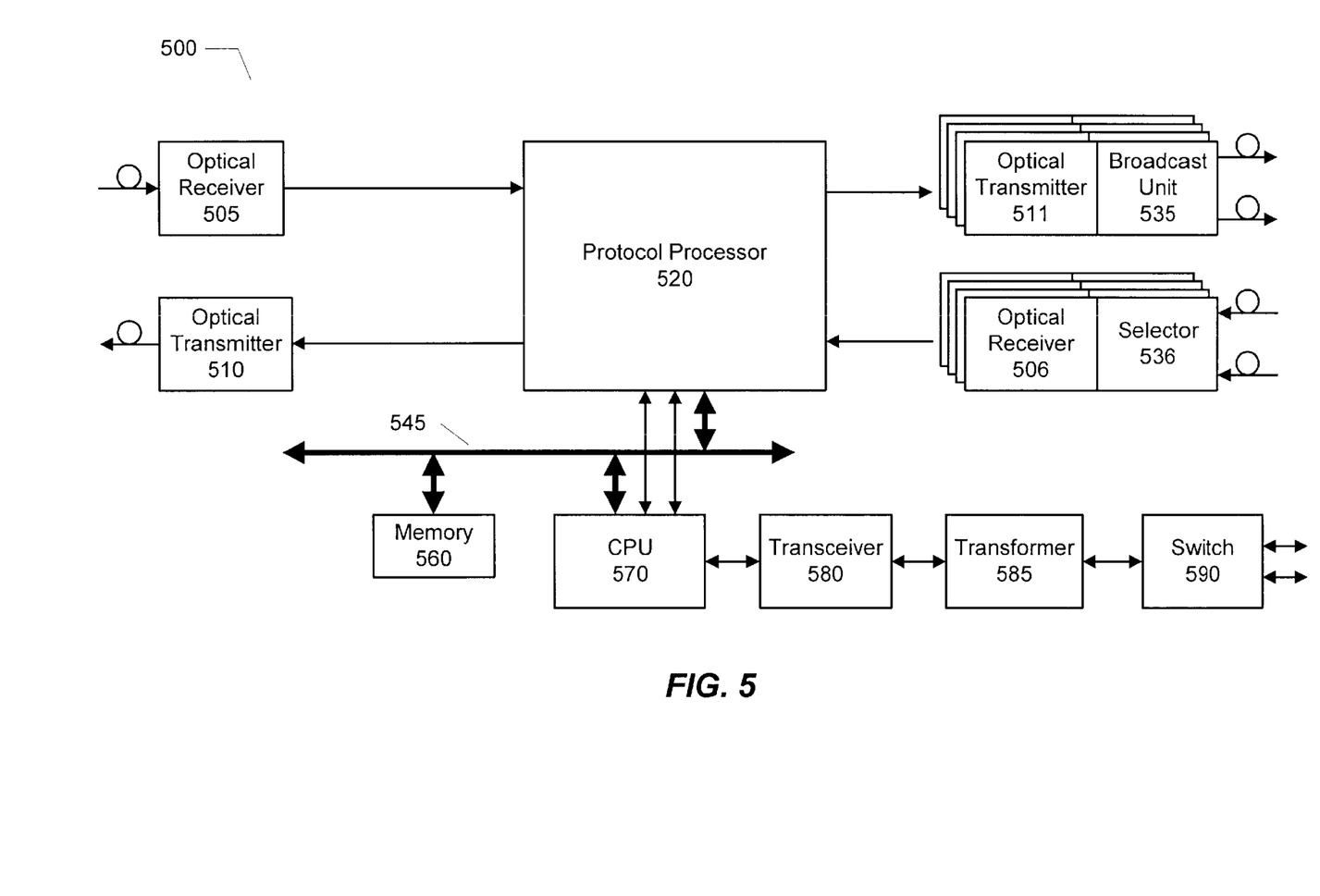
FIG. 5 illustrates the major components of an exemplary line card.

FIG. 5 illustrates the major components of one of line cards 420(1,1)–(N,N), exemplified in FIG. 5 by a line card 500. Line card 500 integrates all necessary hardware and software functions to properly terminate the physical layer. Line card 500 also provides a redundant optical connection to the switch matrix, and a communication channel to other modules in the system.

Line card 500 performs all aspects of the SONET protocol, including framing, insertion and extraction of embedded data channels, error checking, pointer processing, clock recovery, and multiplexing/duplexing. Data enters the system at line card 500 via an OC-48 or OC-192 optical channel. In a SONET implementation, line card 500 terminates the transport overhead (Section+Line) of a SONET data stream, (e.g., a full duplex OC-48 or OC-192 data stream). The extracted SONET payload envelope is then synchronized with a system clock and sent to switching matrix 330. Data leaving the system is processed by the transmit section of the line card, which inserts all required transport overhead bytes into the outgoing stream.

Line card 500 receives optical signals from other network elements via a line side optical receiver 505 and from the local router's system via a system-side optical receiver 506. Each of these receivers implements an optical-to-electrical (O/E) conversion function. Line card 500 transmits optical signals to other network elements using a line-side optical transmitter 510 and to the group matrices using a system-side optical transmitter 511. Each of these transmitters implements an electrical-to-optical (E/O) conversion function. Optical transmitter 511 can transmit an OC-48 data stream or multiples of lower bandwidth data streams (e.g., 4 OC-12 data streams or 48 OC-1 data streams). Optical receiver 506 can receive an OC-48 data stream or multiples of lower bandwidth data streams. Optical transmitter 511 and optical receiver 506 can be duplicated to handle higher bandwidth data streams. For example, four optical transmitters 511 together can transmit an OC-192 data stream and four optical receivers 506 together can receive an OC-192 data stream. It will be noted that line-side refers to the side of the line card coupled to other network elements and system-side refers to the side of the line card coupled to the group matrices.

Line-side optical receiver 505 is coupled to a protocol processor 520 that performs clock recovery multiplexing, de-multiplexing, and SONET STE/LTE (Section Terminating Equipment/Line Terminating Equipment) processing in both directions. Similarly, system-side optical receiver 506 is also coupled to protocol processor 520 to allow protocol processor 520 to receive optical signals. The processed electrical signals from protocol processor 520 are coupled to the transmitters 510 and 511. The clock recovery functions are preferably combined with de-multiplexers and multiplexers to support reception and transmission of the optical data, respectively. The multiplexers serialize output data generated in protocol processor 520 by performing parallel-to-serial conversion on the parallel data. In contrast, de-multiplexers are used in protocol processor 520 to perform serial-to-parallel conversion on received data.

In order to add protection channels, line-side optical transmitter 510 is also coupled to a 1:2 broadcast unit 535. To receive such optical signals, optical receiver 506 is also coupled to a 2:1 selector 536 in order to select the working channel before the optical signals leave the shelf and thus prevent the standby channel (also referred to herein as the protect channel) from using any bandwidth on switching matrix 330.

Protocol processor 520 is coupled to a bus 545. Protocol processor 520 interfaces the line card to two copies of the matrix in a 1+1 physical protocol. In a SONET implementation, protocol processor 520 provides both STE/LTE processing according to published industry standards. Also coupled to bus 545 are a memory 560 and a CPU 570. Memory 560 should be fast enough for efficient operation of CPU 570.

CPU 570 communicates with other line cards 420(1,1)–(N,N) over a control bus (not shown) using a transceiver 580 that is coupled to CPU 570. Transceiver 580, is coupled to a transformer 585 which is coupled to a switch 590. Switch 590 is coupled to the control bus. Switch 590 implements a 1:1 protection scheme for transceiver 580 and couples CPU 570 to two independent ports on the backplane (not shown).

Each of the two ports connects to one copy of the hub of the group matrix. This allows the software on the line card to switch to the backup link when the software detects failures on the active link.

Preferably, CPU 570 includes numerous integrated peripherals including embedded SCC channels (e.g., in-band communications, not shown) and an Ethernet controller (for example, to support communications with other system modules, not shown). In one embodiment, CPU 470 provides an onboard communications processor module (not shown) that handles time-critical aspects of the protocols supported.

Figure 6:
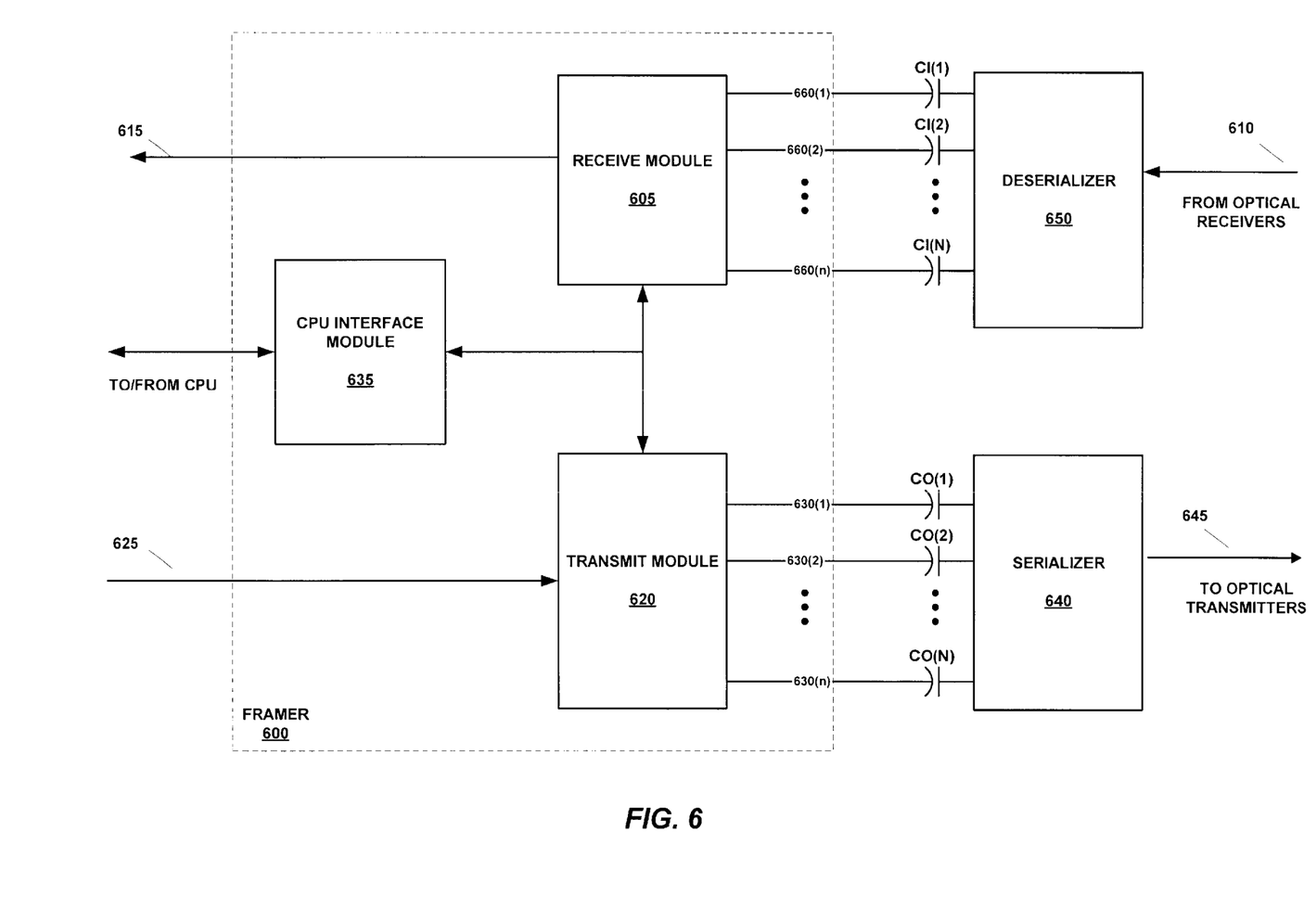
FIG. 6 illustrates a block diagram of portions of protocol processor.

FIG. 6 illustrates a block diagram of portions of protocol processor 520 that includes a framer 600. Deserializer 650 converts a serial incoming SONET signal 610 (e.g., an OC-192 data stream) from line side optical receivers (not shown) into a parallel bitstream 660 which is received by receive module 605. Receive module 605 optionally processes the forward error correction (FEC) information and de-interleaves the OC-192 signal into four OC-48 line rate signals 615 for delivery to downstream OC-48 processors. Transmit module 620 processes four incoming OC-48 system rate signals from the OC-48 processors (signals 625), optionally inserts forward error correction information, and interleaves the four OC-48 signals into an OC-192 signal 630 for transmission by line side optical transmitters (not shown). A CPU Interface module 635 provides the CPU connection to the internal device registers.

OC-192 signal 630 from transmit module 620 and signal 660 to receive module 605 can be 16 bit wide signals at 622.080 MHz (Mega Hertz). Serializer 640 receives and serializes OC-192 signal 630 into a bit wide signal (signal 645) at 9.953280 GHz (Giga Hertz). Deserializer 650 receives a bit wide signal (signal 610) at 9.953280 GHz and deserializes it into a 16 bit wide signal at 622.080 MHz. Framer 600 including receive module 605, transmit module 620 and CPU interface module 635, can be implemented in an ASIC (application specific integrated circuit) using CMOS technology. Due to the high switching speed required of serializer 640 and deserializer 650, GaAs or BiCMOS technology is typically employed for these devices. CMOS technology typically has a operating voltage of 3–5 V whereas GaAs technology operates at approximately –5.2 V. As such, coupling capacitors CI(1:N) and CO(1:N) are used to AC couple the two technologies together for level shifting of the signals. Data lines DI(1:N) and DO(1:N) also contain line terminating resistors (not shown).

AC coupling or capacitive coupling is achieved by connecting a large capacitor in series with the signal path. With a rapidly changing signal the capacitor is unable to charge and discharge as the signal changes because the time constant is too large. If the signal is so slow that the capacitor voltage can change appreciably during a signal cycle, the capacitor charges and discharges with changes in the signal and the signal voltage develops across the capacitor. AC coupling rejects signals with frequencies below a fraction of a Hertz. The result is a DC offset in the voltage of the signal, that is a shift in the overall level of the signal as opposed to a scaling of amplitudes. Since AC coupling rejects signals with frequencies below a fraction of a Hertz, the DC component of the signal is effectively blocked, resulting in a signal which may then be level-shifted to a new logic level.

According to one embodiment of the present invention, transmit module 620 provides test circuitry with the ability to send a bit pattern on the signal path that tests mark ratio tolerance of the entire signal path. The signal path to be tested includes the N bit data path 630(1:N) from transmit module 620, through capacitors CO(1:N), serializer 640, optical transmitters, optical cabling, optical receivers and any other devices connected to and supporting the signal path. The test circuit logic allows for varying densities of ones and zeroes to be generated for the entire outgoing frame.

Figure 7:
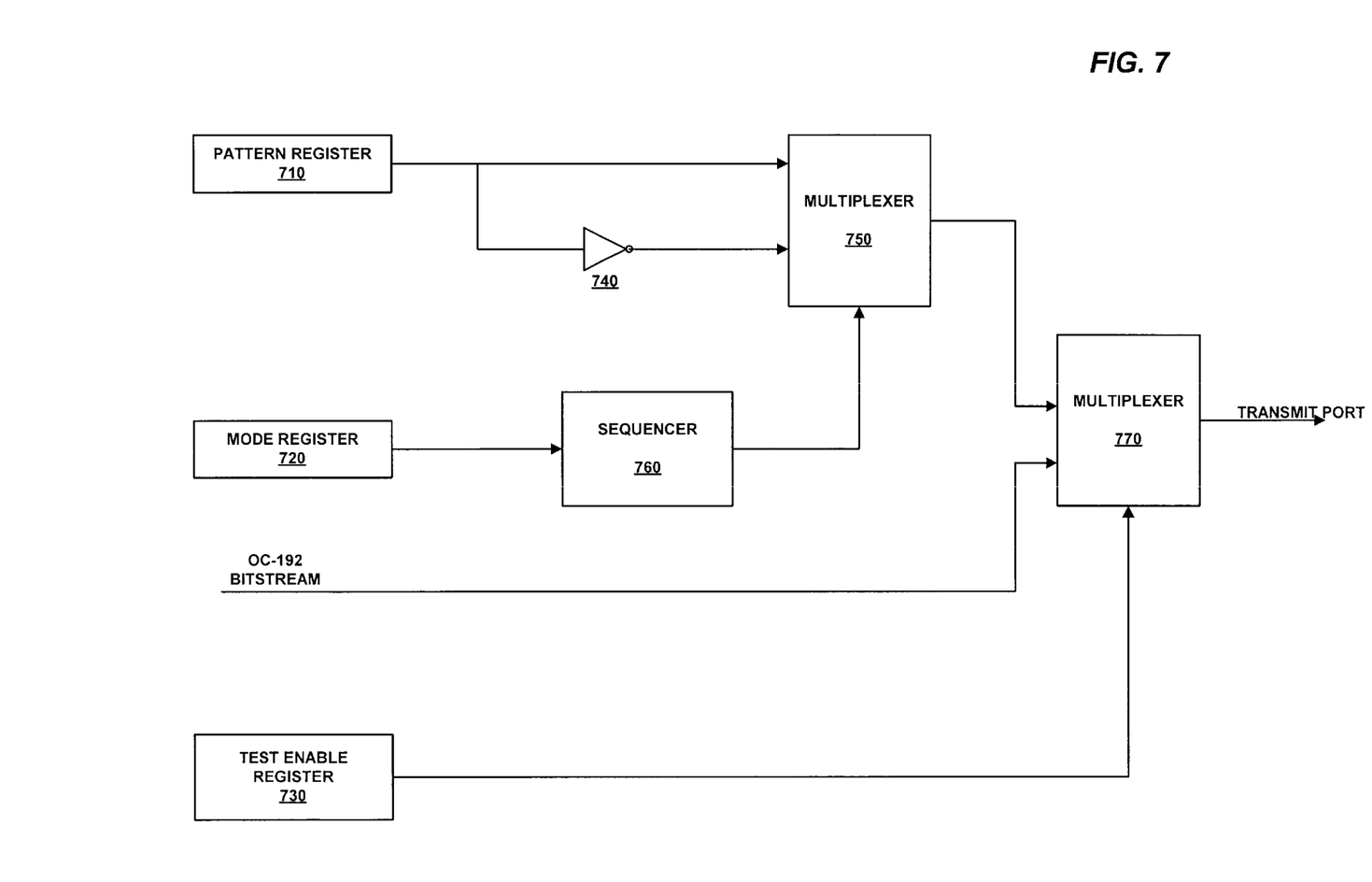
FIG. 7 illustrates test circuitry according to one embodiment of the present invention.

FIG. 7 illustrates test circuitry according to one embodiment of the present invention. Pattern register 710 contains a pattern value used for creating a varying test pattern. The varying test pattern is used to test the mark ratio tolerance of the signal path. Mode register 720 contains a mode value used for creating the varying test pattern. The values of the pattern register and the mode register can be written by the CPU through CPU Interface module 635. In other embodiments, the values can be fixed or selectable by other circuitry or can be from a combination of these methods. Test enable register 730 enables the test circuitry to place the varying test pattern on the transmit port. The value of the enable register can also be written by the CPU through the CPU Interface module 635 or selectable by other circuitry. When enabled, the test circuitry repetitively transmits the varying test pattern on the transmit port.

The varying test pattern is generated by selecting the value of pattern register 710 or the inverted value of pattern register 710. The value of pattern register 710 is received by inverter 740 and multiplexer 750. The inverted value of pattern register 710 is received by multiplexer 750. Multiplexer 750 selects between the value and the inverted value of pattern register 710 according to a select line received from sequencer 760. Sequencer 760 provides a select line to multiplexer 750 according to the value of mode register 720. Mode register 720 defines the mode of transmitting the value of the pattern register. The modes are defined and performed as shown in Table 2.

TABLE 2

Functional Control of Varying Test Pattern

| VALUE | FUNCTION |
|---|---|
| 000 | Value in pattern register is transmitted continuously |
| 001 | Value in pattern register is transmitted for 7 clocks followed by 1 clock of the inverted register value. |
| 010 | Value in pattern register is transmitted for 6 clocks followed by 2 clocks of the inverted register value. |
| 011 | Value in pattern register is transmitted for 5 clocks followed by 3 clocks of the inverted register value. |
| 100 | Value in pattern register is transmitted for 4 clocks followed by 4 clocks of the inverted register value. |
| 101 | Value in pattern register is transmitted for 1 clock followed by 1 clock of the inverted register value. |
| 110 | Reserved for future use. |
| 111 | Reserved for future use. |

Referring to Table 2, a clock cycle is defined by the 622.080 MHz clock used to transmit the OC-192 bit stream. Test enable register 730 selects between the varying test pattern and the OC-192 bit stream via multiplexer 770. The defined pattern is repeated continuously until the mode is changed or the test is disabled.

The assignment of values and functions of mode register 720 can be arbitrarily assigned such that the desired functionality and range of mark ratios is provided. More complex systems may require more mode values and functionalities.

The transmitted pattern is sent on the signal path without the overhead of the normal OC-192 bit stream, that is, the entire frame is filled with the DC pattern and no framing or SONET bytes are generated. In another embodiment of the present invention, the transmitted pattern can be the payload envelope and the normal OC-192 overhead bits are added by the protocol processor. Typically any output scrambling is disabled.

In a preferred embodiment of the present invention, the pattern register is 16 bits wide. Multiplexer 750 selects between the 16 bit value of the pattern register and the inverted 16 bit value of the pattern register. Multiplexer 770 selects between the varying test pattern received from multiplexer 750 and the OC-192 bit stream.

In alternate embodiments, the pattern register can be any desired bit width. In addition, the OC-192 bit stream and the OC-192 clock cycles can be any bit stream and associated clock cycle.

In a preferred embodiment of the present invention, the test circuitry is designed using a hardware description language such as VHDL and implemented in an integrated circuit such as an ASIC or programmable gate array.

Figure 8:
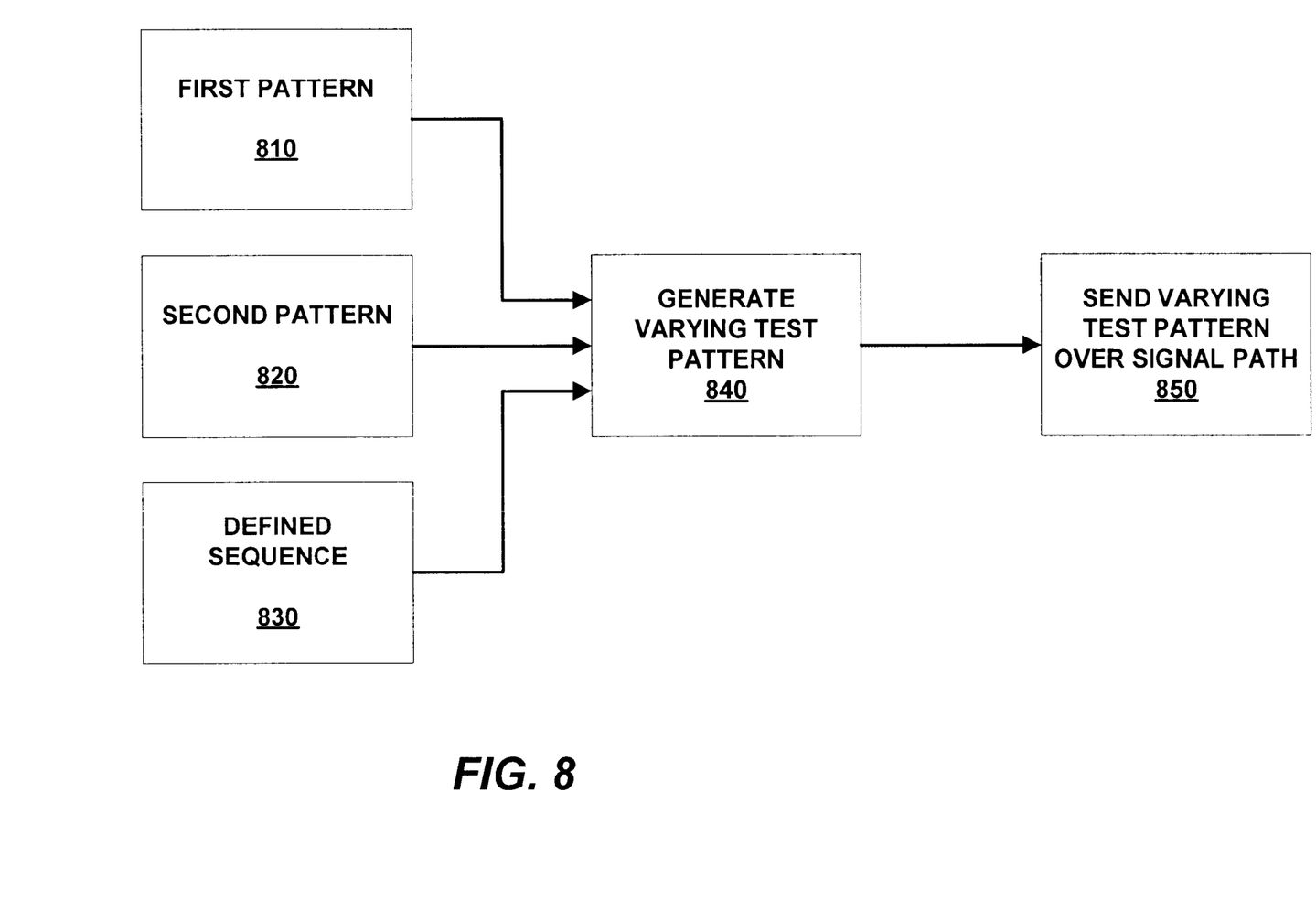
FIG. 8 illustrates the method of performing mark ratio tolerance testing according to the present invention.

FIG. 8 illustrates the method of performing mark ratio tolerance testing according to the present invention. A first pattern, block 810, a second pattern, block 820, and a defined sequence, block 830 are received and used to generate varying test pattern, block 840. The defined sequence defines the selection and between the first and second pattern and the timing of the selection. The varying test pattern is sent over a signal path, block 850. The first and second patterns and the defined sequence are defined according to the structure of the signal path. For example, a signal path that does not have parallel data lines or AC coupling can have simple first and second patterns. Also, for a simple signal path, the second pattern may not be used to generate the varying test pattern. The more complex the serializing and de-serializing of the signal path, the more complex patterns and the more complex the defined sequencing.

Referring to Table 2, a pattern of "0101 0101 0101 0101" and a mode of "000" provides a data density of 50% for a data communications channel consisting of only serial data lines. A mode of "100" with the above pattern provides a data density of 50% on a data communications channel consisting of 16 bits of parallel data later converted to a one bit stream of serial data. A change of mode to "001" again provides a data density of 50% for a data communications channel consisting of only serial data, but not for the channel consisting of 16 bits of parallel data later converted to 1 bit of serial data. The parallel data channel would have a mark ratio of 1/8.

It will be apparent to those skilled in the art that various combinations of the bit pattern and modes can be used based on the complexity of the signal path to achieve various mark ratios and data densities.

An alternate embodiment of the invention includes bit pattern and mode values that are selected rather than written to registers. In addition, the enabling of the test circuitry can be automatic based on timers or other conditions.

According to the present invention, mark ratio tolerance testing is achieved by transmitting a varying test pattern. The present invention enables testing to be performed automatically. The present invention allows the testing of the entire signal path, including parallel and serial portions of the signal path, including AC coupled parallel and serial data lines. In addition, traditional oscilloscopes and spectrum analyzers are able to be used since the problems of DC drift on the AC coupled data lines can be controlled by the selection of the data pattern. The present invention provides reliable mark ratio tolerance testing for the entire signal path. By allowing the entire signal path to be tested together, the results are more reliable than a pieced together result. Overall, the use of the present invention saves testing time and cost, and produces reliable results.

Also, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of testing mark ratio tolerance of a signal path, the method comprising:

generating a varying test pattern by selecting between a first pattern and a second pattern according to a defined sequence; and sending the varying test pattern over the signal path, the signal path having a first portion and a second portion;

wherein the varying test pattern has a varying data density through the first portion of the signal path and a constant data density through the second portion of the signal path.

2. The method of claim 1, wherein the first portion of the signal path is a one bit serial path and the second portion of the signal path is a N bit parallel path.

3. The method of claim 2, wherein N is 16.

4. The method of claim 1, wherein the generating the varying test pattern comprises:

writing a value to a pattern register;

writing a value to mode register; and enabling test circuitry to vary the value written to the pattern register according to the value written to the mode register.

5. The method of claim 1, wherein the second pattern is an inversion of the first pattern.

6. The method of claim 1, wherein the constant data density is 50% which provides a mark ratio of 4/8.

7. The method of claim 1, wherein the varying test pattern is varied to determine the mark ratio tolerance limits of the signal path.

8. The method of claim 1, wherein the method is performed in a communication circuit disposed in a synchronous optical network (SONET).

9. The method of claim 8, wherein the communication circuit is implemented as an application specific integrated circuit (ASIC).

10. The method of claim 8, wherein the communication circuit is implemented as an ASIC disposed in a line card.

11. An apparatus to test mark ratio tolerance of a signal path, the apparatus comprising:

a selection circuit configured to generate a varying test pattern to send over the signal path by selecting between a first pattern and a second pattern according to a select sequence signal;

a sequencer coupled to the selection circuit, the sequencer configured to provide the select sequence signal to the selection circuit, the sequencer configured to generate the select sequence signal according to a mode value; and the signal path having a first portion and a second portion;

wherein the varying test pattern has a varying data density through the first portion of the signal path and a constant data density through the second portion of the signal path.

12. The apparatus of claim 11, wherein the first portion of the signal path is a one bit serial path and the second portion of the signal path is a N bit parallel path.

13. The apparatus of claim 12, wherein N is 16.

14. The apparatus of claim 11, wherein the second pattern is an inversion of the first pattern.

15. The apparatus of claim 11, wherein the constant data density is 50% which provides a mark ratio of 4/8.

16. The apparatus of claim 11, wherein the varying test pattern is varied to determine the mark ratio tolerance limits of the signal path.

17. The apparatus of claim 11, wherein the apparatus is disposed in a synchronous optical network (SONET).

18. The apparatus of claim 11, wherein the apparatus is implemented as an application specific integrated circuit (ASIC).

19. The apparatus of claim 11, wherein the apparatus is implemented as an ASIC disposed in a line card.

20. A computer program product for communication, the computer program product comprising:

signal bearing media bearing programming adapted to:

generate a varying test pattern by selecting between a first pattern and a second pattern according to a defined sequence;

send the varying test pattern over a signal path; and the signal path having a first portion and a second portion;

wherein the varying test pattern has a varying data density through the first portion of the signal path and a constant data density through the second portion of the signal path.

21. The computer program product for communication of claim 20 wherein the first portion of the signal path is a one bit serial path and the second portion of the signal path is a N bit parallel path.

22. The computer program product for communication of claim 20 wherein the second pattern is an inversion of the first pattern.

23. The computer program product for communication of claim 20 wherein the varying test pattern is varied to determine the mark ratio tolerance limits of the signal path.

24. A communication system comprising:

means for generating a varying test pattern by selecting between a first pattern and a second pattern according to a defined sequence;

means for sending the varying test pattern over a signal path; and the signal path having a first portion and a second portion;

wherein the varying test pattern has a varying data density through the first portion of the signal path and a constant data density through the second portion of the signal path.

25. The communication system of claim 24, wherein the first portion of the signal path is a one bit serial path and the second portion of the signal path is a N bit parallel path.

26. The communication system of claim 25, wherein N is 16.

27. The communication system of claim 24, wherein the means for generating the varying test pattern comprises:

means for writing a value to a pattern register;

means for writing a value to mode register; and means for enabling test circuitry to vary the value written to the pattern register according to the value written to the mode register.

28. The communication system of claim 24, wherein the second pattern is an inversion of the first pattern.

29. The communication system of claim 24, wherein the varying test pattern is varied to determine the mark ratio tolerance limits of the signal path.

30. The communication system of claim 24 disposed in a synchronous optical network (SONET).

* * * * *